United States Patent
Dayan et al.

(10) Patent No.: US 10,332,511 B2
(45) Date of Patent: Jun. 25, 2019

(54) PROCESSING SPEECH TO TEXT QUERIES BY OPTIMIZING CONVERSION OF SPEECH QUERIES TO TEXT

(71) Applicant: International Business Machines Corporation, Armonk, NY (US)

(72) Inventors: Yigal S. Dayan, Jerusalem (IL); Josemina M. Magdalen, Jerusalem (IL); Irit Maharian, Tzur Hadasa (IL); Victoria Mazel, Jerusalem (IL); Oren Paikowsky, Jerusalem (IL); Andrei Shtilman, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/808,146

(22) Filed: Jul. 24, 2015

(65) Prior Publication Data
US 2017/0025120 A1   Jan. 26, 2017

(51) Int. Cl.
| | |
|---|---|
| *G06F 17/27* | (2006.01) |
| *G10L 15/26* | (2006.01) |
| *G10L 15/18* | (2013.01) |
| *G06F 17/30* | (2006.01) |
| *G10L 15/22* | (2006.01) |

(52) U.S. Cl.
CPC ........ *G10L 15/1822* (2013.01); *G06F 17/274* (2013.01); *G06F 17/30663* (2013.01); *G06F 17/30666* (2013.01); *G06F 17/30672* (2013.01); *G06F 17/30699* (2013.01); *G10L 15/26* (2013.01); *G10L 2015/228* (2013.01)

(58) Field of Classification Search
CPC ............................... G10L 15/26; G06F 17/274
See application file for complete search history.

(56) References Cited

U.S. PATENT DOCUMENTS

| | | | | |
|---|---|---|---|---|
| 5,265,065 | A * | 11/1993 | Turtle | G06F 17/30011 |
| 6,182,029 | B1 | 1/2001 | Friedman | |
| 6,516,312 | B1 * | 2/2003 | Kraft | G06F 17/3061 |
| | | | | 707/610 |
| 6,631,346 | B1 * | 10/2003 | Karaorman | G10L 15/1822 |
| | | | | 704/275 |
| 7,236,972 | B2 | 6/2007 | Lewak | |
| 7,548,847 | B2 * | 6/2009 | Acero | G06F 17/241 |
| | | | | 704/1 |

(Continued)

OTHER PUBLICATIONS

List of IBM Patents or Patent Applications Treated as Related, May 2, 2016, 2 pages.

(Continued)

*Primary Examiner* — Bryan S Blankenagel
(74) *Attorney, Agent, or Firm* — Joseph Polimeni; Edell, Shapiro & Finnan, LLC

(57) ABSTRACT

Techniques for processing a speech to text query are described herein. The techniques may include receiving a plurality of speech to text translation alternatives for a phrase of a natural language query, and tagging and parsing each of the translation alternatives based on a static analysis of the known domain that is at least partially structured, known tags of the known domain, and custom rules. The techniques may also include ranking the translation alternatives based on the tagging and parsing and translating the phrase based on the ranking.

12 Claims, 5 Drawing Sheets

(56) References Cited

U.S. PATENT DOCUMENTS

| | | | |
|---|---|---|---|
| 7,983,914 B2 | 7/2011 | Eckhart et al. | |
| 8,688,447 B1* | 4/2014 | De | G10L 15/1815 704/231 |
| 8,694,305 B1* | 4/2014 | Grove | G06F 17/28 704/1 |
| 8,700,404 B1* | 4/2014 | Chotimongkol | G10L 15/1815 704/255 |
| 8,914,277 B1* | 12/2014 | Liu | G06F 17/271 704/10 |
| 2003/0126136 A1 | 7/2003 | Omoigui | |
| 2003/0212664 A1 | 11/2003 | Breining | |
| 2004/0015548 A1* | 1/2004 | Lee | H04L 12/1827 709/204 |
| 2004/0153435 A1 | 8/2004 | Gudbjartsson | |
| 2006/0053096 A1 | 3/2006 | Subramanian | |
| 2006/0074634 A1* | 4/2006 | Gao | G06F 17/271 704/9 |
| 2006/0106769 A1 | 5/2006 | Gibbs | |
| 2008/0097748 A1 | 4/2008 | Haley | |
| 2008/0133479 A1 | 6/2008 | Zelevinsky | |
| 2010/0049502 A1* | 2/2010 | Oppenheim | H04M 3/4931 704/9 |
| 2010/0076972 A1* | 3/2010 | Baron | G06F 17/3071 707/736 |
| 2010/0104087 A1* | 4/2010 | Byrd | H04M 3/42221 379/265.09 |
| 2010/0145902 A1* | 6/2010 | Boyan | G06F 17/3089 706/54 |
| 2010/0293195 A1* | 11/2010 | Houghton | G06F 17/241 707/776 |
| 2011/0224982 A1 | 9/2011 | Acero et al. | |
| 2011/0313757 A1* | 12/2011 | Hoover | G06F 17/274 704/9 |
| 2011/0320203 A1 | 12/2011 | Reich | |
| 2012/0166182 A1 | 6/2012 | Ko | |
| 2012/0215533 A1* | 8/2012 | Aravamudan | G06F 17/30253 704/235 |
| 2012/0323554 A1* | 12/2012 | Hopkins | G06F 17/2818 704/2 |
| 2012/0323574 A1 | 12/2012 | Wang et al. | |
| 2013/0006613 A1* | 1/2013 | Karov Zangvil | G06F 3/0237 704/9 |
| 2013/0080152 A1* | 3/2013 | Brun | G06F 17/30666 704/9 |
| 2013/0166598 A1 | 6/2013 | Vaitheeswaran | |
| 2013/0332162 A1* | 12/2013 | Keen | G10L 15/26 704/235 |
| 2014/0012580 A1* | 1/2014 | Ganong, III | G10L 15/1815 704/257 |
| 2014/0019435 A1 | 1/2014 | Ceri | |
| 2014/0093845 A1* | 4/2014 | Kim | G06F 17/273 434/162 |
| 2014/0129218 A1 | 5/2014 | Liu et al. | |
| 2014/0163959 A1* | 6/2014 | Hebert | G06F 17/2785 704/9 |
| 2014/0201202 A1 | 7/2014 | Jones et al. | |
| 2014/0244246 A1 | 8/2014 | Nutaro et al. | |
| 2014/0330819 A1 | 11/2014 | Raina et al. | |
| 2014/0344173 A1 | 11/2014 | Jayade | |
| 2015/0046371 A1* | 2/2015 | Leary | G06F 17/274 705/347 |
| 2015/0081658 A1 | 3/2015 | Meyles | |
| 2016/0012020 A1* | 1/2016 | George | G06F 17/2785 704/9 |
| 2016/0371392 A1 | 12/2016 | Brown | |
| 2017/0024431 A1 | 1/2017 | Dayan et al. | |
| 2017/0024443 A1 | 1/2017 | Dayan et al. | |
| 2017/0024459 A1 | 1/2017 | Dayan et al. | |

OTHER PUBLICATIONS

Michael Tjalve., "Accent Features and Idiodictionaries: On Improving Accuracy for Accented Speakers in ASR", University College London, PhD in Experimental Phonetics, Mar. 2007, 236 pages.

Yanli Zheng et al., "Accent Detection and Speech Recognition for Shanghai-Accented Mandarin", Interspeech, 2005, pp. 217-220.

Tablan et al., "A Natural Language Query Interface to Structured Information", Department of Computer Science, University of Sheffield, pp. 1-15, 2008.

Androutsopoulos et al., "Natural Language Interfaces to Databases—An Introduction", arXiv:cmp-lg/9503016v2, Mar. 16, 1995, pp. 1-50.

CucerZan, et al., "Spelling correction as an iterative process that exploits the collective knowledge of web users", Retrieved at http://www-scf.usc.edu/~csci572/papers/Cucerzan.pdf, Proceedings of the 2004 Conference on Empirical Methods in Natural Language Processing, A meeting of SIGDAT, a Special Interest Group of the ACL, held in conjunction with ACL, Jul. 25-26, 2004, pp. 8.

List of IBM Patents or Patent Applications Treated as Related, Jul. 24, 2015, 1 page.

* cited by examiner

PROCESSING SPEECH TO TEXT QUERIES BY OPTIMIZING CONVERSION OF SPEECH QUERIES TO TEXT

BACKGROUND

The present invention relates generally to optimizing queries. More specifically, the techniques described herein include processing speech to text natural language queries

SUMMARY

In one embodiment, a method, a system, and a computer program product for processing a speech to text query is described herein. The method includes receiving a plurality of speech to text translation alternatives for a phrase of a natural language query, and tagging and parsing each of the translation alternatives based on a static analysis of the known domain that is at least partially structured, known tags of the known domain, and custom rules. The method further includes ranking the translation alternatives based on the tagging and parsing and translating the phrase based on the ranking.

DETAILED DESCRIPTION

Figure 1:
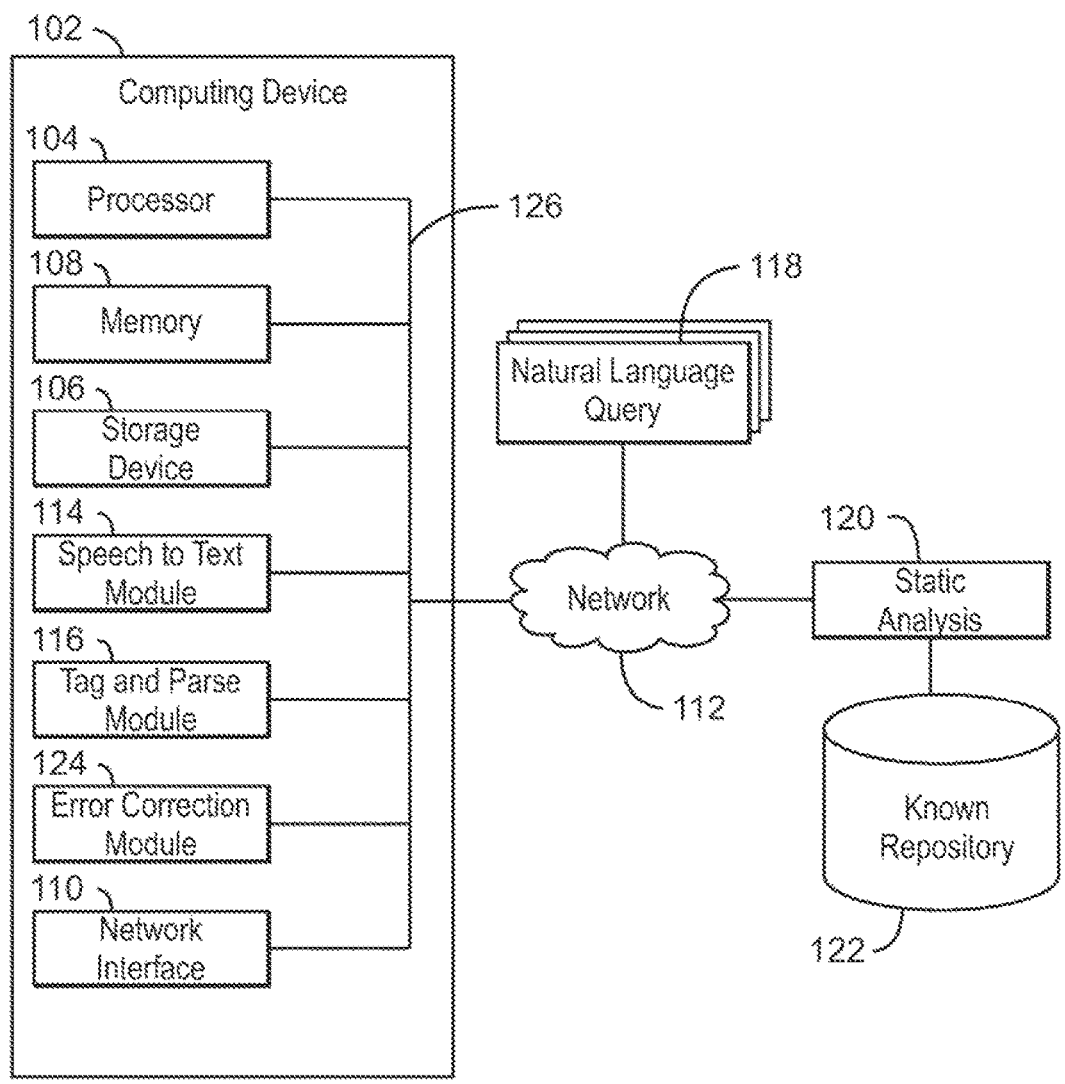
FIG. 1 is a block diagram of a computing system configured to process a speech to text query according to an example embodiment of the present invention.

The subject matter disclosed herein relates to techniques for processing a speech to text query. Natural language queries may be difficult to process into structured language queries. In some cases, processing natural language queries may employ a "bag of words" method wherein each word within a phrase is attempted to be found within a given domain. However, a bag of words approach may, in some cases, provide inaccurate results. In some cases, a natural language query may be submitted vocally and translated via a speech to text (s2t) engine. However, in many cases s2t engines are inaccurate and may be susceptible to errors based on differences in a given speaker's accent, pronunciation, and the like. By comparison, understanding the meaning of natural language queries enhances voice-to-text conversions and, thus, present invention embodiments employ several heuristics methods.

The techniques described herein leverage a generic phonetics algorithm, but initialize it so it works on names or facets extracted from the repositories. The techniques described herein improve upon s2t engine results by applying them to a "tagger parser" based on a static analysis of a known domain that is at least partially structured. A static analysis, as referred to herein, is an analysis which determines known values for a given domain, known relationships between the values, and the like, before runtime of a tagger parser. In some embodiments, a static analysis may identify facets. A facet may include a field having a limited number of values. In some embodiments, a field may be free form, but recognized as a facet if the values of this field are statistically limited. As an example of a facet, a query by an employee of a company may contain the word "product." If the company only sells a limited number of products, then a facet may be identified having a field name "product" and the limited number of individual products listed. As another example of the static analysis, a user matrix may be identified. A user matrix may contain a list of users associated with a known domain, as well as common nicknames, and measures of closeness between a given user and another user. Closeness may be identified by a number of times that two users appear in the same document for example. In the techniques described herein, if a user submits a natural language query to an s2t engine, names of other users associated with the submitting user may be identified in a given query. For example, if a user named Nick submits a query including "find emails from Paul," the results of the s2t engine may be refined based on a name list of users associated with Nick, possibly including Paul. Priority may be given to a "Paul" who is in close contact with Nick. In other words, the user matrix may include user relationships within a domain that may be utilized for various techniques, or portions thereof, provided herein.

Further, the results of the s2t engine may be further refined into structured conditions where possible. The tagger parser is an engine configured to convert natural language to structured conditions. The tagger parser may rely, in part, on the static analysis to build a structured condition tree associated with the natural language query. It may also include generic shallow parsing rules defined for a specific language domain. As results from an s2t engine are received, the results may be applied to the tagger parser to identify structured components of the query based on the known static analysis and the known domain. In other words, the techniques described herein improve upon s2t engine results by using static analysis and a tagger parser for a known, and therefore, limited domain.

FIG. 1 is a block diagram of a computing system configured to process a speech to text query. The computing system 100 may include a computing device 102 having a processor 104, a storage device 106 comprising a non-transitory computer-readable medium, a memory device 108, and a network interface 110.

In some embodiments, the network interface 110 may be communicatively coupled to a network 112. The computing device 102 may include an s2t module 114 and a tag and parse module 116, referred to herein as tagger parser 116. The s2t module 114 may receive one or more natural language queries 118 via the network 112. In some embodiments, the natural language queries 118 are directly received at the computing device 102 without going through the network. Further, in some embodiments, any given component, or any portion of a given component, of the computing device 102 may be located remotely. For example, the s2t module 114 may be located in the network 112 rather than local to the computing device 102.

In any case, components including the s2t module 114, the tagger parser 116, and the like may be logic, at least partially comprising hardware logic. For example, the s2t module 114, the tagger parser 116, and the like may be electronic circuitry logic, firmware of a microcontroller, and the like. In some embodiments, the s2t module 114, the tagger parser 116, and the like, may be implemented as instructions executable by a processing device, such as the processor 104. The instructions may direct the processor 104 to receive a plurality of speech to text translation alternatives for a phrase of a natural language query, such as a phrase of one of the natural language queries 118. The tagger parser 116 may be configured to tag and parse each of the translation alternatives based on a static analysis 120 of the known domain 122 that is at least partially structured. The known domain 122 maybe referred to herein as a known repository 122. The instructions may be further configured to rank the translation alternatives based on the tagging and parsing.

As discussed above, and in more detail below, translations of a given natural language query may be first processed by the s2t engine 114. Results of the s2t engine 114 may include a number of translations. The tagger parser 116 may be used to further refine the translations in view of the static analysis 120 and the known repository 122. The tagger parser 116 will attempt to identify terms within the natural language query by matching individual terms, as well as combinations of terms, with known fields having restricted or limited values. In some embodiments, the terms may be restricted by name lists, known facets, known associations of users to a given user name within a query, or from whom a query is submitted, and the like. The tagger parser 116 may tag terms based on the static analysis 120 such that a machine readable query, such as a structured query language "SQL" query may be identified. The tagger parser 116 may also attempt to identify sequences of words which have a larger semantic meaning in the language.

In some embodiments, translation alternatives may have a section that is not covered by the tagging and parsing. In this scenario, the uncovered section may have been translated erroneously by the s2t engine. For example, a spoken natural language query may include the phrase "List the BVT tests." The s2t 114 may return only "List the PVT tests," rather than the "List the BVT tests" as intended. In this scenario, a known repository 122 error correction by error correction module 124 can be applied which will suggest "BVT" instead of "PVT." The error correction can take common mistakes that are known and replace them with corrections on sections that are not covered by the tagger parser 116. Once the error has been corrected, the corrected term may be resubmitted to the tagger parser 116 for confirmation. If the tagger parser 116 successfully tags the corrected error, it may be considered a confirmed correction. Since the error correction is limited to sections that are not covered by the tagger parser, the results are more precise.

The processor 104 may be a main processor that is adapted to execute the stored instructions. The processor 104 may be a single core processor, a multi-core processor, a computing cluster, or any number of other configurations. The memory unit 108 can include random access memory, read only memory, flash memory, or any other suitable memory systems. The main processor 104 may be connected through a system bus 126 to components including the memory 108, and the storage device 106.

The block diagram of FIG. 1 is not intended to indicate that the computing device 102 is to include all of the components shown in FIG. 1. Further, the computing device 102 may include any number of additional components not shown in FIG. 1, depending on the details of the specific implementation.

Figure 2:
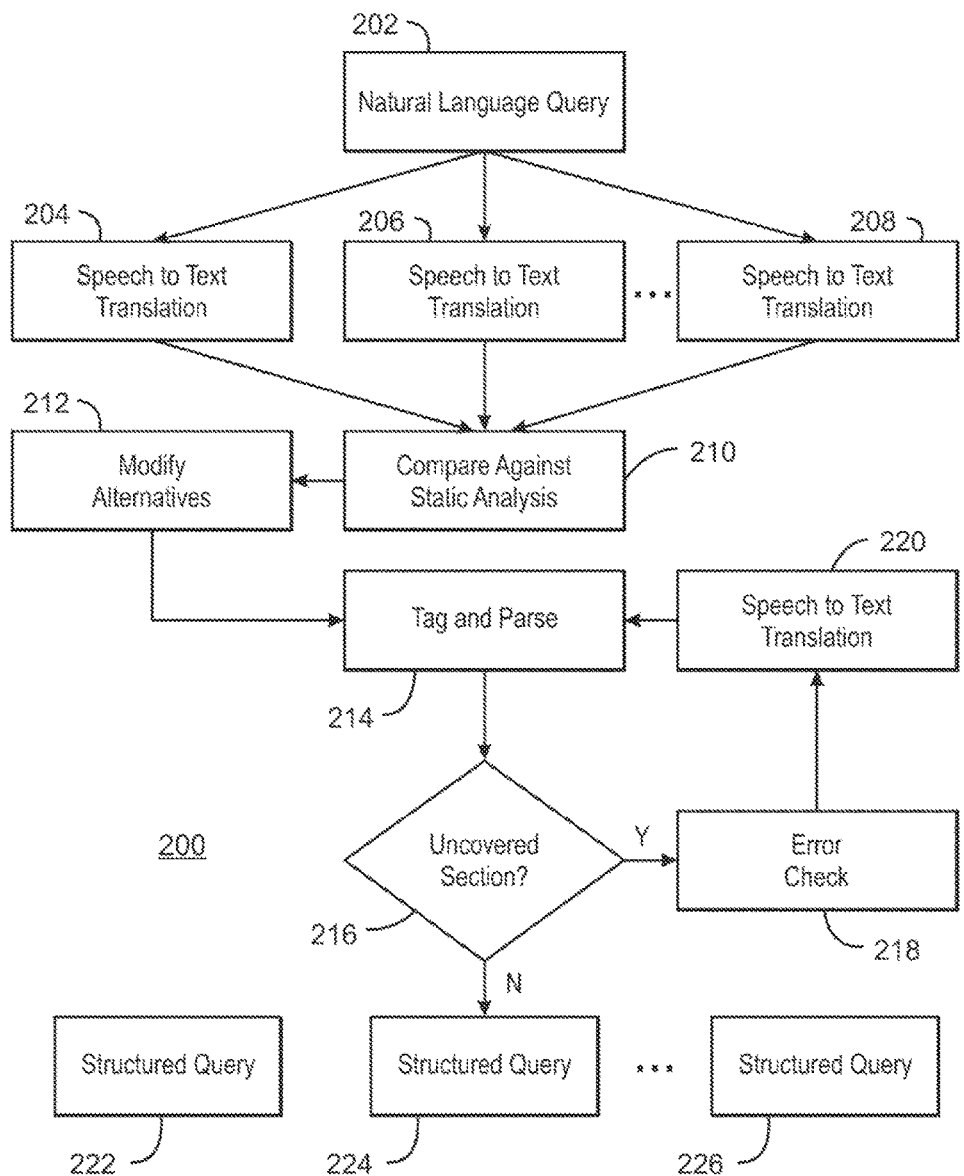
FIG. 2 is a process flow diagram illustrating a processing of a speech to text query according to an example embodiment of the present invention.

FIG. 2 is a process flow diagram illustrating an embodiment of processing a speech to text query. As discussed above, the techniques described herein include improving upon results of s2t translation alternatives. At block 202, a natural language query is received, and an s2t engine, such as the s2t module 114 of FIG. 1, generates translation alternatives 204, 206, 208. Each of the translation alternatives 204, 206, and 208 may be improved upon by first comparing the alternatives 204, 206, and 208 to elements of a static analysis, as indicated at 210. Elements of the static analysis may include word lists of a known domain, user matrices for the known domain, facets wherein a given field includes a limited number of possible values, and the like. Translation alternatives 204, 206, and 208 may be modified at 212 based on the comparison to the static analysis at 210. For example, a translation alternative may include the term "product," and a correct name of the product, while other translations may include the term "product" and an incorrect translation of the product name. For a given known domain, there may be a limited number of products available in the field "product." Therefore, translation alternatives may be compared against known products in the static analysis at 210, and translations having incorrect product names may be modified at 212. At 214, the modified alternatives are tagged and parsed. Tagging and parsing is based on what is known in the static analysis as well as generic tags, such as dates and times. For example, a query translation including "email from Bob from last January," may be tagged with a generic "date" tag for the phrase "last January," and with a domain specific "name" tag for the word "Bob." In some embodiments, words containing a name may be phonetically checked against a user matrix during the static analysis comparison step 210. A user matrix may identify a given user name and may identify known associates of a given user name, alternative spellings for a given user name, closeness based on frequency of interaction between two user names, and the like. For example, a user issuing the original natural language query at 202 may have known associates. Therefore, translations having a name, such as "Bob," that appear to be ranked high in a user matrix associated with the original user who issued the query may be preferred above names having a lower rank according to the user matrix, such as "Tom" for example, that appear in other translation alternatives.

Tagging and parsing at 214 will attempt to cover a translation alternative. A word or phrase of each translation alternative is covered when it is successfully tagged. However, in some embodiments, at least a portion of a translation alternative will not be tagged, and therefore will remain uncovered. Translation alternatives that have a greater coverage will be preferred. Often, uncovered sections of a translation alternative may occur based on common known errors associated with a given domain. Therefore, at 216 the process 200 determines whether there are uncovered sections of any given translation alternative. If yes, then at 218, the uncovered portion is checked for known errors, and at 220, errors are corrected. To verify that the errors were corrected, the corrected portion may be parsed and tagged again at 214. If no further uncovered sections exist, then the correction is assumed to be successful, and structured queries may be generated at 222, 224, and 226.

It is noted that tagging and parsing performed at 214 may include several phases. For example, a first phase may parse and tag terms in a given query. At a second phase, the tagged terms may be tagged again at a second level of structured association. A final result may include a structured conditional tree that may be used to form a machine readable query, such as an SQL query.

Figure 3:
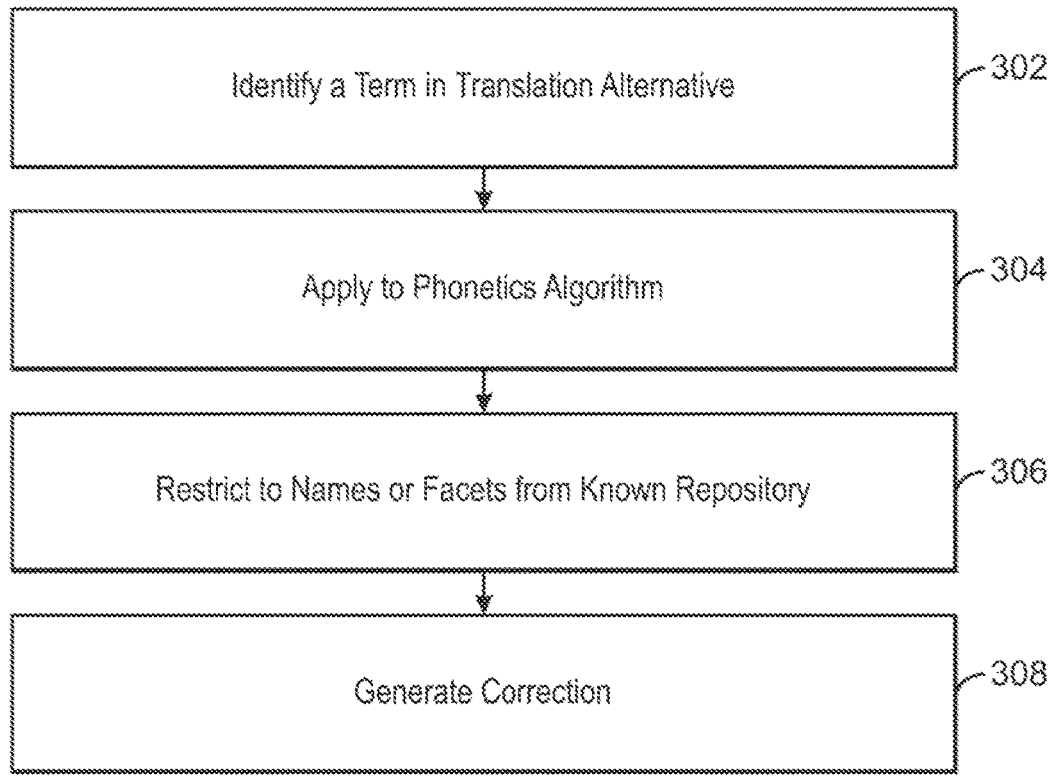
FIG. 3 is a process flow diagram illustrating a method of processing a speech to text query according to an example embodiment of the present invention.

FIG. 3 is a process flow diagram illustrating a method of processing a speech to text query. As discussed above in reference to FIG. 1 and at 210 in FIG. 2, a static analysis may be used to compare translation alternatives to known facets or name lists. In FIG. 3, a more detailed example of a process 300 of comparing a translation alternative is provided. At block 302, a term within a translation alternative is identified, and at 304, a phonetics algorithm is applied. The phonetics algorithm may be a generic phonetics algorithm, but may be restricted at 306 to names or facets from a known repository, such as the known repository 122 of FIG. 1. A correction, generated at 308, may be based on the restricted phonetic algorithm application.

In some embodiments, the phonetic algorithm will identify distance measures between the words suggested by a translation alternative, and a closed list of names from the known repository 122. If the distance is small, words in a given translation alternative can be substituted with known names having a small distance, based on a threshold. Substituted names may then be run through the tagger parser 116, to generate structured conditions. If, due to the substitution, more conditions are generated (or the same number is generated but the coverage of the translation is wider), then the repository substitution is preferred over the original term appearing in the s2t translation alternative. In some embodiments, rather than applying a phonetic algorithm everywhere, it is applied only where it appears in a translation in a place where it can form a legitimate name condition as determined by the tagger parser 116.

Figure 4:
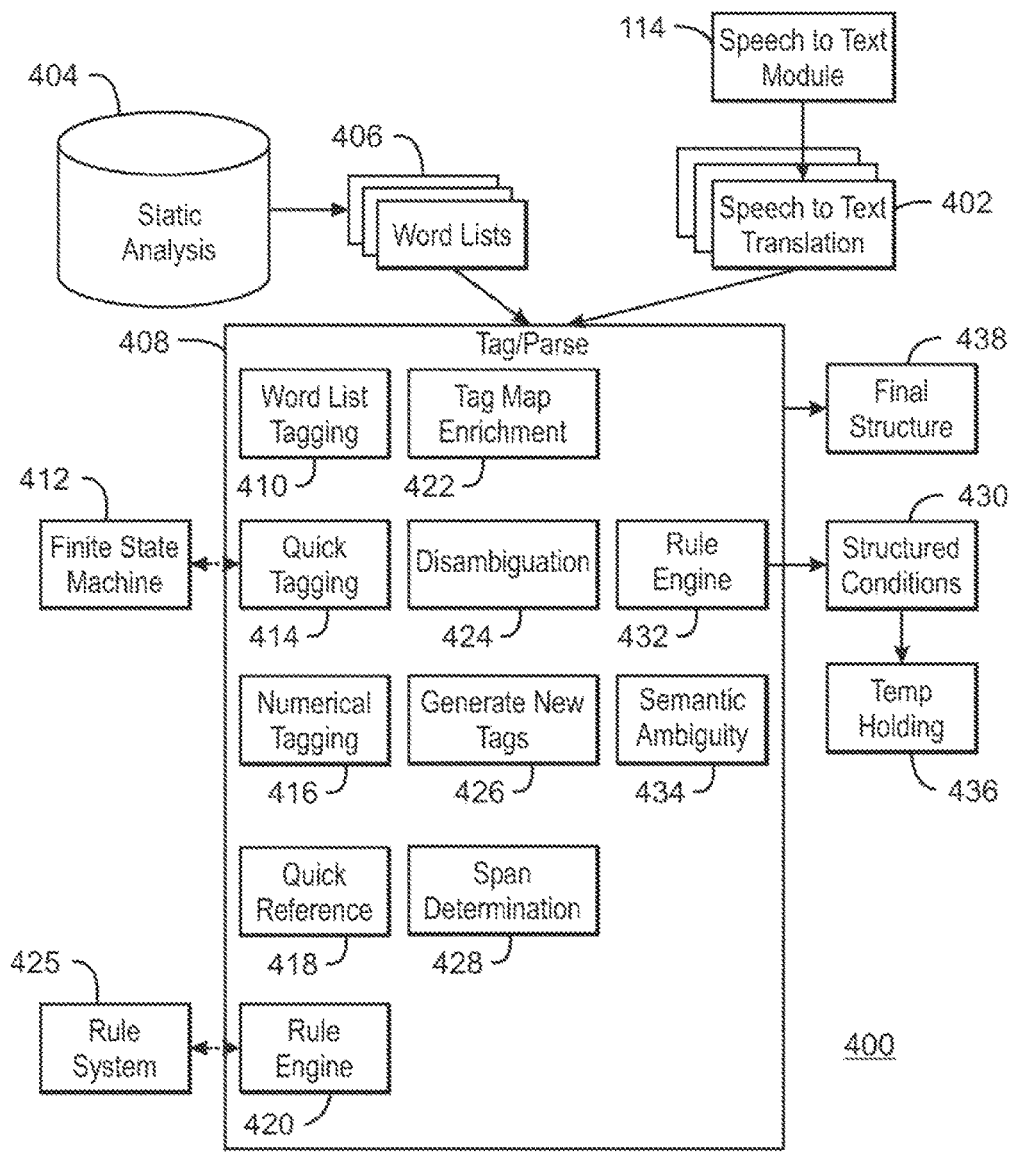
FIG. 4 is a process flow diagram illustrating an example of an improvement of speech to text alternatives based on applying methods of a tagger parser according to an example embodiment of the present invention.

FIG. 4 is a process flow diagram illustrating improvement of speech to text alternatives based on applying methods of a tagger parser. Initially, an s2t engine, such as the s2t module 114 of FIG. 1 generates one or more s2t translations 402 based on a submitted natural language query. A static analysis database 404 may include word lists 406. The word lists 406 may be used to tag and parse the s2t translations 402 at block 408. In other words, tagging/parsing 408 of raw text may be based on a technique of word and/or phrase lists that a user can freely predefine for a given known repository, as indicated at 410. Each word list 406 may represent a tag and query words that may be found tagged by an identifier for each word list 406. For example, a list "period.txt" may contain the terms "minute," "hour," "day," "week," "month," "quarter," "year," and the like. In some embodiments, a word that appears in a list can be tagged by additional independently defined wordlists. For example, a word list "month.txt" may contain the words "January," "February," "March," etc. If a word or phrase from a word list 406 is found in the s2t translation alternatives 402, the word or phrase may be tagged with a list name. For example, a query containing "the email sent last week of January" may be tagged "the email sent last <TIME QUALIFIER> week <PERIOD> of January <MONTH>."

In some embodiments, a text word or phrase may have several tags attached to it. Additionally or alternatively, each word or phrase in a word list 406 may be associated with a more abstract entity depending on the concept that the word list represents. For example, a word list 406 may be identified as "date_near.txt" containing the following words and phrases and numerical qualifiers: "the day before yesterday; −2," yesterday; −1," "today; 0," "tomorrow; +1," "the day after tomorrow; +2," and the like. In this example, each word or phrase is mapped to a number representing an offset from "today." This number is available within the generated tag for subsequent date calculations.

In some embodiments, various writings of the same name may appear in the s2t translation alternatives 402. For example, a name may be shortened to a nickname, rather than a full name. In these embodiments, a name list among the word lists 406 may include "nicknames.txt" containing two fields in each line, wherein the first is the word as encountered in the query and the second is the word is it appears in a known repository, such as the known repository 122 as detailed in the static analysis database 404. For example, the "nicknames.txt" word list may include "alex; alexis," "allie: alice," "elsie; alice;" "lisa; alice," "allie; alicia," "elsie; alicia," "lisa; alicia," and the like.

In some embodiments, a word list among the word lists 406 may include phrases that generate an open ended date range. For example, a word list may include words or phrases such as "later than," "no later than," "no sooner than," and the like. In these embodiments, tagging may contain information to facilitate generation of an open range, such as which side of the range should be opened, whether the boundary is included or excluded from the range, and so on.

In some embodiments, tagging/parsing at 408 may reference a finite state machine (FSM) 412. In these embodiments, tagging/parsing at 408 may be relatively quick in comparison to non-FSM 412 based tagging, as indicated at 414. The quick tagging 414 may be generated via the FSM 412 based on all wordlists. In this scenario, a single pass on the query text with this FSM 412 will tag the words and phrases of the text with the words and/or phrases in one or more of the word lists 406.

Each tag occurring at 414 may include a tag name, such as "date_near_tag," a tag value, such as "yesterday," and in some embodiments a mapping or numerical value, such as "−1," as well as a location/span of the tag in the translation alternatives 402. For example, if a query in an s2t translation alternative 402 includes "the day before yesterday," two "date_near_tag" tags may be generated by the FSM 412. The two "date_near_tag" tags may include one with the value "the day before yesterday," the mapping of "−2," and a location from word #1 to word #4 in the query, as well as one with a value "yesterday," the mapping "−1," and the location from word #4 to word #4.

At block 416, the s2t alternatives 402 may be scanned for numbers and appropriate numeric tags may be entered. All sequences identified as numbers are tagged with "number" tag, and mapped to the associated number. In some embodiments, numbers may also be tagged as "number_cardinal," "number_ordinal," "day," "day_cardinal," "day_ordinal," "year," and the like. For example, the phrase "3rd" may be tagged at 416 with the tags "number" and "number_ordinal." To generate these tags at 416, a tagger parser, such as the tagger parser 116 of FIG. 1, may make use of mappings found by previously generated tags. For example, the text phrase "twenty-three" may already be tagged at 410 with the mapping "23." Further, in some embodiments, short matches may be removed in favor of longer ones. For example, adjacent numeric phrases such as "two-hundred" "and" "twenty three" may be combined into a single number.

In some embodiments, setting a quick reference may be used, as indicated at 418. In these embodiments, each found tag name is mapped to a list of all tags found for it in the query. For example, a "date_near_tag" tag name may be mapped at 418 to the multiple tags found for it, such as a tag for "yesterday" and a tag for "the day before yesterday."

In some embodiments, a rule engine 420 may be created and may be driven by a rule system 425 that looks for sequences of tags and/or original words from the text. Rules can look for adjacent tags that are at a given proximity from each other. For example, a word list from among the word lists 406 may be "next_last.txt" containing the phrase "the last," or similar. A second word list from among the word lists 406 may be "periods.txt" as defined above. A rule (<insert action here, . . . last, next; Number_Cardinal; periods;) may be added to the rule engine 420 that will find word sequences such as "the next five weeks" or "the last thirty days." Each tag name specified in the rule represents a semantic group or a word list. The rule looks for any words or phrases from the first word list which are followed immediately by any words or phrases from the second wordlist, and so on. More specifically, the rule works by getting all occurrences of the condition tags from a tag map, and all compatible tag combinations. When a complete match is found (all tag conditions are accounted for) an action is triggered. In short, the rule finds every valid combination of tags, and for each combination it triggers the action passing the combination as an input.

The rule engine 420 may include two types of engine actions. First, a new tag may be added to the tag map. The new tag may be immediately available for matching by subsequent rules of the rules engine. Second, structured conditions may be generated that may later be used to formulate SQL queries that can carry the meaning of a natural language request.

A typical rule may contain a name of an action to invoke, followed by conditions that trigger the action. For example, a rule may include makeDate/simple; . . . date_near. In this rule, "date_near" may be a condition that was found in the original query. The rule component "makeDate/simple" may be the action of this rule, meaning that a routine will be invoked to create a new <DATE> tag. This rule is triggered by a single condition: the existence of the tag "date_near." As discussed above, this tag is created when the text contains such phrases as "the day before yesterday." When the rule is triggered, the tags that triggered it are sent to the "makeDate" action for processing. Besides triggering tags, the action receives an optional context parameter, in this case the string "simple". The generic "makeDate" action can use this context string to perform various tasks if it so chooses. Note that for the input text "the day before yesterday" the action is invoked twice, once for the tag that covers "yesterday" and once for the tag that covers "the day before yesterday." In one embodiment, makeDate inspects the tags passed to it (in this case a single "date_near" tag) and extracts the mapping associated with it (in this case the offset from today).

When invoked for "yesterday" the rules engine 420 will find the offset −1. For "the day before yesterday" it will find the offset −2. It passes the offset to a date utility that returns a time range structure denoted by two (begin, end) dates: getPeriodRange (PERIOD period, int offset, int numberOfItems). The rules engine 420 receives a unit of time (day, month, week etc.), an offset from current time, and the number of time units wanted. To receive a range for "the day before yesterday" a call getPeriodRange(PERIOD.DAY, −2, 1) is initiated. The returned time range is delimited by (begin, end) dates. It is possible to create an open-ended time range by setting one of the two dates to a small or large constant. This structuring is how the system begins to understand the query incrementally and this understanding helps to eventually generate a structured date condition.

In some embodiments, the tagging/parsing 408 may include enriching a tag map as indicated at 422. For example, the makeDate action is used for enriching at 422 the tag map with a new DATE tag. A DATE tag contains, in addition to the normal tag attributes, a structured date range object with start and end dates.

In the aforementioned example the action is invoked twice, and two DATE tags are added to the tag map. The first tag has the same sentence location as the word "yesterday" (location word#4 to word #4) and includes a date range covering yesterday. The second tag has the same sentence location as the phrase "the day before yesterday" (location word#1 to word #4) and includes a date range for 2 days ago.

In some embodiments, the tagging/parsing 408 may include a disambiguating of meanings by removing overlaps as indicated at 424. Since the phrase "the day before yesterday" may be preferred to the term "yesterday", a cleanup rule that scans DATE tags for overlaps and removes the shorter spans can be periodically invoked, perhaps by a user. This is done by inserting a special action into the rules system: CLEANUP; DATE.

In some embodiments, tagging/parsing 408 may include generation of new tags based on previous findings, as indicated at 426. This enables building up complex expressions incrementally and creating new structures from primitive ones. For example, once a DATE has been added to the tag map, subsequent rules can make use of it immediately.

Another example may include flexible formatting of a date. The context string may contain formatting characters. For a rule that finds nine/ninth of November 2012, the rule may include "formattedDate/DxmY; DAY; WORD/of; month; YEAR;" wherein DxmY are formatting characters. The syntax WORD/of means to look for an occurrence of the word "of" in the original text, not for an occurrence of a tag). In another example, a period may be tagged within a period. To parse "the first/last 2 weeks in this quarter", this rule may be used: "makeDate/period_in_period; first_last; NUMBER_CARDINAL; periods; in_of; DATE." Note that this rule may be too broad. In general rules can trigger illogical input phrases such as "the first two years of this month" or "the third month of January." Therefore the triggered action performs an extra validation—it determines the graininess of each period (whether it's best expressed in days, weeks, months, quarters or years) and verifies that the first one fits within the second. A new tag may be added only if the two input periods are compatible.

In another example, a date range may be opened up. For example, a phrase "no later than July of last year," then the rule may include "extendDate/after_inclusive; phrase/no later than/2; DATE." In this rule, the syntax "/2" means a distance of 1 or 2 words between the phrase and the DATE tag is allowed. A context string is passed "after_inclusive" to the action, to indicate that the open range should include the original date range within it (July is part of the range).

In another example, inexact dates may be added, such as dates "the end of July." In this scenario, the rule may include "makeDate/fuzzy; phrase/the end of; DATE." The actual end period used is configurable and depends on the size of the date range that is being modified.

In another example, a single range may be formed from two date ranges. For example, the phrase "beginning on March the second and ending at the end of next April" may be used to form a single range. The rule may include "extendDate/merge_1×2; WORD/beginning; on_at; DATE; phrase/and ending; on_at; DATE." In this scenario, the rule may be generalized further by using tags that contain synonyms for "beginning" and "ending".

In some embodiments, tagging/parsing at 408 may include determining the exact span (sentence location) of a new tag for better accuracy in tag generation and disambiguation, as indicated at 428. Generally the span of a new tag is the span of all its input conditions. For example, if "last" is at location (1,1) and "Friday" is at location (2,2), then the rule "makeWeekday; next_last; weekday;" may generate a DATE tag with the location (1,2). However, this does not always work well. Consider the texts "created Friday" and "expires Friday." In the first case a past date may be referred to while in the second a future date may be referred to. A date rule that has conditions on words preceding "Friday" to allow a correct interpretation may be useful, as long as these conditions are not a part of the new date tag. One solution is to create special wordlists 'hint_past.txt' and 'hint_future.txt' which tell us whether to expect a past or future date. Tags that start with 'hint_' will not form part of the new span (although the larger span is noted since it may be preferred during disambiguation). Two rules may be added: "makeWeekday/future; hint_future//4; weekday;" and "makeWeekday/past; hint_past//4; weekday." These rules look for a past hint (e.g. 'created') or future hint (e.g. 'expires') 4 or less words before the weekday.

An extra context parameter tells the makeWeekday action to create a past or future date. 'hint_' tells it not to include the first input span in its calculations. The action will generate a correct DATE tag for "Friday" with the same location as the word "Friday".

As discussed above, structured conditions may be generated based on enriched tags, as indicated at 430. A second rule engine 432 contains rules that trigger on combination of tags, just like the first rule engine 420. However, the actions performed by these rules are to create a set of structured conditions that can later serve as a base for SQL queries.

For example, conditions for dates may include "dateCondition/date_sent_handler," "date_sent//4; DATE," wherein "date_sent" is a word list containing words such as send, sent, copied to, cc-ed. DATE is a time range discovered by the previous rule engine and inserted into the set of tags. If the word 'sent' is followed by a date at a maximum distance of 4, a condition is created on a date range by calling the dateCondition method. The method 400 receives a context parameter, 'date_sent_handler.' This string is a handle to a list of repository classes and attributes that will be necessary to formulate the condition.

Some documents may have been added to the repository accompanied by an XML that facilitates text search. In such use cases, it is possible for the handle to refer to a list of xpaths that will be searched (rather than a list of fields to search). Specifying an abstract handle to attributes and xpaths allows a rigid separation to be kept between the universal rules and the specific repository being queried. All repository-specific information is sequestered separately. This allows new repositories to be connected to without making any changes in the engine's 432 rules.

In the example above, the actual definition for date_sent_handler may contain the repository information: "date_sent_handler; Email/SentOn; ICCMail3/ICCMailDate. Two repository fields are mentioned. This means the engine will be creating two conditions, one that checks the SentOn attribute in Email documents, and one that checks the ICCMailDate attribute in ICCMail3 documents. Each generated date condition uses its calculated time range to specify a start and end time for the date field. At the final stage the condition can be translated to a SQL statement such as: "WHERE (SentOn>=20130728T000000Z AND SentOn<=20130803T235959Z)."

Other examples of conditions generated by this rule engine 432 are discussed below. In some embodiments, conditions may include documents sent from/to a specific person or having a specific mimetype or facet. To discover facets, the repository, such as the known repository 122 of FIG. 1, may be processed in advance to identify facets as well as non-facet metadata fields that have a limited range of values and can therefore be considered to be facets. A 'facet' wordlist may be created automatically from these values. Each line contains a value, and a mapping to the fields where it appears. The facet wordlist is incorporated into the general FSM 412. When a facet value is tagged in the text, a condition can be generated to look for this value in the relevant metadata fields.

In some embodiments, semantic ambiguity may be handled, as indicated at 434. Expressions such as "between August and September 1999" can be parsed two ways: "between ((August and September) 1999)" and "between (August and (September 1999))." The rule engine can score the former tag when it is generated so that it is preferred to the second one during cleanup.

In some embodiments, all conditions can be added to a temporary holding area, as indicated at 436. Since generated conditions may not be compatible with each other, all of them may be put into the temporary holding area 436 for further processing.

In some embodiments, a query may be complemented with free text conditions. In this scenario, parts of the text that could not be parsed into structured conditions are converted into free text conditions. Free text can be searched in all text fields or in specific ones. For example, a rule that triggers on "WORD/with; *; in_title;" can generate a condition to search for the wildcard words in the title or subject. Before doing this, stop words and boilerplate phrases that have been tagged may be removed. Removing boilerplate expressions may be performed using the same rule mechanism including creating a wordlist called "skip_verb.txt" containing phrases such as "I want," "please give me," "get," and the like. As another example, a wordlist called "skip_object.txt" containing phrases such as "the document," "email," "files," and the like may be created. In some embodiments, a ^ word may be inserted at the beginning of the text to allow conditions on start of text. Then, the rule "removeFreetext; WORD/^; skip_verb; skip_object;" may capture and remove a large number of boilerplate expressions from the beginning of the request. However, this rule may not actually remove the boilerplate phrases from the request. And these words may still be available for other types of tagging and condition generation, but they will not be sent to a free-text search.

A final condition structure may be built, as indicated at 438. In one implementation, the final structure 438 includes three levels. A first level may include different SQL queries, wherein each one selects for a specific document class. In a second level each SQL query may have several AND clauses. In a third level each item in an AND clause may have several conditions "ORed" together.

In some embodiments, compatible conditions may be generated from the temporary holding area 436. In some embodiments, heuristics for generating conditions may be implemented. For example, if there are several conditions found for the same docClass (i.e "Document Class") attribute (or xpath), they are ORed. Otherwise, if a docClass has conditions on different attributes, they are ANDed. Furthermore, if two docClasses are related (one is derived from the other), an attempt is made to merge their conditions, and a single SQL query is generated on the most-derived object. In other words, least-derived docClasses attempt to "donate" their conditions to all derived docClasses that have conditions. If such a donation could not be made, a separate SQL query is generated for those least-derived docClasses.

In some embodiments, a donation may not always be made, as the following example will illustrate. Consider a least-derived document class 'Document' with two derived classes, 'Email' & 'Record'. The Document class has the attribute 'Creator' while the Record class has the attribute 'DeclaredBy' and the Email class has the attribute 'From.' In this case donating 'Document' attributes to 'Email' makes sense. The 'Document.Creator' and 'Record.DeclaredBy' attributes complement each other, so their conditions can be joined by AND. One example may be an SQL example: "SELECT d.* FROM Record d WHERE (d.Creator='alice') AND (d.DeclaredBy='bob')." However, conditions on 'Document.Creator' and 'Email.From' are incompatible. Although 'Email' is derived from 'Document', typically only one of these two fields will be populated, depending on whether a Document class instance or Email class instance is at hand. Therefore a SQL query like "SELECT d.* FROM Email d WHERE (d.Creator='john') AND (d.From='john@my.com')" may fail, and this type of merger may not be allowed.

The techniques described herein handle this issue by keeping a list of incompatible docClass_Attribute pairs. Incompatible conditions will not be joined into the same SQL query but will generate separate SQL queries (one for Document.Creator and another for Email.From).

In some embodiments, full queries can be composed from the condition structure. The structure can be converted to SQL statements appropriate and conforming to the known repository 122, and submit them to the known repository 122. The final results may be federated from the returned result sets. If no results are returned, or their score is low, it is possible to relax some of the conditions and try again. One way of doing this is by specifying a relaxed alternative for some of the conditions as they are being generated. For example, the phrase "please show me the email I sent to John a week ago" can be relaxed in two ways. In a first way, the approximated range of "a week ago" may be expanded. In a second way, all repository instances of "John," and not just the ones which are in close affinity to the sender, may be queried, wherein the affinities were determined by static analysis 404 of the known repository 122. In some embodiments, it is also possible to take a condition that searches for a value in a specific field, and change it into a global free text search. Another approach is to use phonetic correction, driven by known values in the known repository 122, as discussed above in regard to FIG. 2.

As discussed above, scoring heuristics may be employed. In some embodiments, one aspect of the system is a weighting algorithm that is meant to enhance the shallow parser outcome. In some embodiments, facet scores may be boosted. Facets are enums or common metadata values that exist in the repository. When such a value or enum alias is found in the text, a condition may be generated that looks for the value in the appropriate document class attribute based on the static analysis 404 of the known repository 122. While such conditions are powerful, it is easy to create spurious conditions by latching onto words that happen to be facets, so careful calibration may be needed.

Heuristic scores can be generated based on the various considerations. In some embodiments, whether the text contains (beside the facet value) a "booster" tag that relates to the docClass or the docClass attribute where that facet appears may be a factor in generating heuristic scores. For example, the tag 'email' hints to probably look for fields that belong to the Email docClass. In some embodiments, closeness of a booster tag to the facet value in the text may be a factor in generating heuristic scores. In this scenario, a close proximity may boost the condition's score more. In some embodiments, whether there is more than one booster tag for this value may be a factor in generating heuristic scores.

Additional score boosters may take into account the following considerations: how much of the query is covered by structured metadata conditions; how much by freetext conditions; how many condition terms in the query; what is the ranking returned by the free-text search; were boosted terms found in the title over terms found in the body; how many results were returned by the SQL query; how deep is the docClass being searched, and the like. In some embodiments, queries that contain more condition terms, relate to a more specific docClass (a derived docClass rather than the generic Document docClass) and return a small number of results will get an extra boost before they are federated into the final set of results. Further, in some embodiments, another option is to start with a very restrictive set of conditions, and relax them if no results or very low-scoring results are returned.

It will be appreciated that the embodiments described above and illustrated in the drawings represent only a few of the many ways of implementing embodiments of the present invention. The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g. the rank improvement application). These systems may include any types of monitors and input devices (e.g., keyboard, mouse, voice recognition, etc.) to enter and/or view information.

It is to be understood that the software (e.g., the rank improvement application) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., the rank improvement application) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., tags and conditions). The database system may be implemented by any number of any conventional or other databases, data stores or storage structures (e.g., files, databases, data structures, data or other repositories, etc.) to store information (e.g., tags and conditions). The database system may be included within or coupled to the server and/or client systems. The database systems and/or storage structures may be remote from or local to the computer or other processing systems, and may store any desired data (e.g., tags and conditions).

The present invention embodiments may employ any number of any type of user interface (e.g., Graphical User Interface (GUI), command-line, prompt, etc.) for obtaining or providing information (e.g., tags and conditions), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, JavaScript, objective C and C#, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
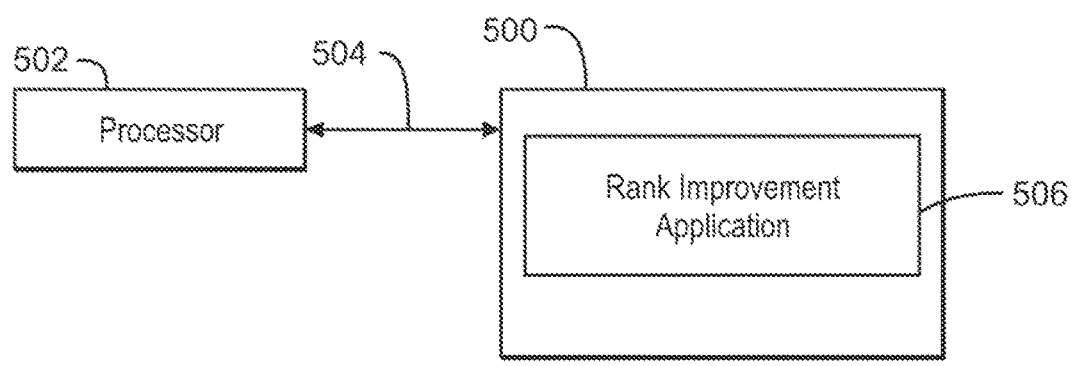
FIG. 5 is a block diagram depicting an example of a tangible, non-transitory computer-readable storage medium that can be used to process a speech to text query according to an example embodiment of the present invention.

FIG. 5 is a block diagram depicting an example of a tangible, non-transitory computer-readable storage medium that can be used to process a speech to text query. The tangible, non-transitory, computer-readable medium 500 may be accessed by a processor 502 over a computer bus 504. Furthermore, the tangible, non-transitory, computer-readable medium 500 may include computer-executable instructions to direct the processor 502 to perform the steps of the current method.

The various software components discussed herein may be stored on the tangible, non-transitory, computer-readable medium 500, as indicated in FIG. 5. For example, a rank improvement application 506 may be configured to receive a plurality of speech to text translation alternatives for a phrase of a natural language query. The rank improvement application 506 may further be configured to tag and parse each of the translation alternatives based on a static analysis of the known domain that is at least partially structured and known tags of the known domain. The rank improvement application 506 may further be configured to rank the translation alternatives based on the tagging and parsing.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or carry out combinations of special purpose hardware and computer instructions.

The descriptions of the various embodiments of the present invention have been presented for purposes of illustration, but are not intended to be exhaustive or limited to the embodiments disclosed. Many modifications and variations may be apparent to those of ordinary skill in the art without departing from the scope and spirit of the described embodiments. The terminology used herein was chosen to best explain the principles of the embodiments, the practical application or technical improvement over technologies found in the marketplace, or to enable.

What is claimed is:

1. A computing device for improving an accuracy of a generated text query based upon a phrase of an audible natural language query, comprising:
   a storage device;
   a processor;
   the storage device having instructions that when executed by the processor, cause the computing device to:
   receive a plurality of speech to text translation alternatives for the phrase of the audible natural language query;
   compare each of the translation alternatives to elements of a static analysis of a known domain including at least one of word lists of the known domain, user matrices of the known domain, and facets, each of which having a limited number of possible values;

identify a respective term in at least one translation alternative from the plurality of translation alternatives based on the comparing;

substitute, for the identified term in each of the at least one translation alternative, a respective known name from the known domain based on a distance measure between the identified term and a closed list of names from the known domain;

tag and parse each of the translation alternatives with generic tags and specific tags for the known domain that is at least partially structured, wherein the tagging and parsing further comprises generating one or more new tags based on previous findings to build up complex expressions incrementally and create new structures from primitive structures, and the tagging and parsing is based on:

the static analysis of the known domain which determines known relationships between known values of the known domain, known tags of the known domain, and custom rules, each of which includes a respective name of an action to invoke and one or more respective conditions that trigger the action, wherein the one or more generated new tags are available upon creation for use by subsequent rules;

identify a particular translation alternative from the translation alternatives having a section of the phrase that is not tagged and covered by the tagging and parsing;

correct an error due to speech to text translation and associated with the section that is not covered by replacing one or more terms of the section based on a known list of common errors associated with the known domain;

rank the translation alternatives based on the tagging and parsing; and generate a text query to perform the natural language query by translating the phrase of the natural language query to a machine readable statement based on the ranking, wherein:

the tagging and parsing, the substituting, for each of the identified term in each of the at least one translation alternative, the respective known name from the known domain, the correcting an error due to speech to text translation and the ranking of the translation alternatives improve an accuracy of the generated text query.

2. The computing device of claim 1, further comprising instructions that when executed by the processor, cause the computing device to confirm the corrected error by resubmitting the corrected error for subsequent tagging and parsing, wherein the corrected error is confirmed when the subsequent tagging and parsing successfully tags and parses the corrected error.

3. The computing device of claim 1, wherein the ranking of the translation alternatives is based on identifying translation alternatives that overlap with the limited number of possible values of one of the facets.

4. The computing device of claim 1, further comprising instructions that when executed by the processor, cause the computing device to refine the translation alternatives before tagging and parsing by correcting misspellings and errors within the translation alternatives to words or phrases that exist in the known domain.

5. The computing device of claim 4, wherein correcting misspellings and errors in names within the translation alternatives is based on a user matrix that defines known names within the known domain and relationships between the known names, wherein the relationships include measures of closeness between the known names, the measures of closeness being determined based on a frequency of interactions between two particular known names in the known domain.

6. The computing device of claim 5, further comprising instructions that when executed by the processor, cause the computing device to:

tag and parse the translation alternatives based on the measures of closeness, so that the translation alternatives intended for a particular known name will be ranked higher when the translation alternatives include one of the known names that has a high measure of closeness with the particular known name.

7. A computer program product for improving an accuracy of a generated text query based upon a phrase of an audible natural language query, the computer program product comprising a computer readable storage medium having program code embodied therewith, the program code executable by a processor to perform a method, comprising:

receiving a plurality of speech to text translation alternatives for the phrase of the audible natural language query;

comparing each of the translation alternatives to elements of a static analysis of a known domain including at least one of word lists of the known domain, user matrices of the known domain, and facets, each of which having a limited number of possible values;

identify a respective term in at least one translation alternative from the plurality of translation alternatives based on the comparing;

substitute, for the identified term in each of the at least one translation alternative, a respective known name from the known domain based on a distance measure between the identified term and a closed list of names from the known domain;

tagging and parsing each of the translation alternatives with generic tags and specific tags for the known domain that is at least partially structured, wherein the tagging and parsing further comprises generating one or more new tags based on previous findings to build up complex expressions incrementally and create new structures from primitive structures, and the tagging and parsing is based on:

the static analysis of the known domain which determines known relationships between known values of the known domain, known tags of the known domain, and custom rules, each of which includes a respective name of an action to invoke and one or more respective conditions that trigger the action, wherein the one or more generated new tags are available upon creation for use by subsequent rules;

identifying a particular translation alternative from the translation alternatives having a section of the phrase that is not tagged and covered by the tagging and parsing;

correcting an error due to speech to text translation and associated with the section that is not covered by replacing one or more terms of the section based on a known list of common errors associated with the known domain;

ranking the translation alternatives based on the tagging and parsing; and generating a text query to perform the natural language query by translating the phrase of the natural language query to a machine readable statement based on the ranking, wherein:

the tagging and parsing, the substituting, for each of the identified term in each of the at least one translation alternative, the respective known name from the known domain, the correcting an error due to speech to text translation and the ranking of the translation alternatives improve an accuracy of the generated text query.

8. The computer program product of claim 7, the method further comprising confirming the corrected error by resubmitting the corrected error for subsequent tagging and parsing, wherein the corrected error is confirmed when the subsequent tagging and parsing successfully tags and parses the corrected error.

9. The computer program product of claim 7, wherein the ranking of the translation alternatives is based on identifying translation alternatives that overlap with the limited number of possible values of one of the facets.

10. The computer program product of claim 7, the method further comprising refining the translation alternatives before tagging and parsing by correcting misspellings and errors in the translation alternatives to words or phrases that exist in the known domain.

11. The computer program product of claim 10, wherein correcting misspellings and errors in names within the translation alternatives is based on a user matrix that defines known names within the known domain and relationships between the known names, wherein the relationships include measures of closeness between the known names, the measures of closeness being determined based on a frequency of interactions between two particular known names in the known domain.

12. The computer program product of claim 11, the method further comprising:

tagging and parsing the translation alternatives based on the measures of closeness, so that the translation alternatives intended for a particular known name will be ranked higher when the translation alternatives include one of the known names that has a high measure of closeness with the particular known name.

\* \* \* \* \*